G. F. SMITH.
SYSTEM OF CONTROL.
APPLICATION FILED MAR. 11, 1919.
1,367,103.
Patented Feb. 1, 1921.
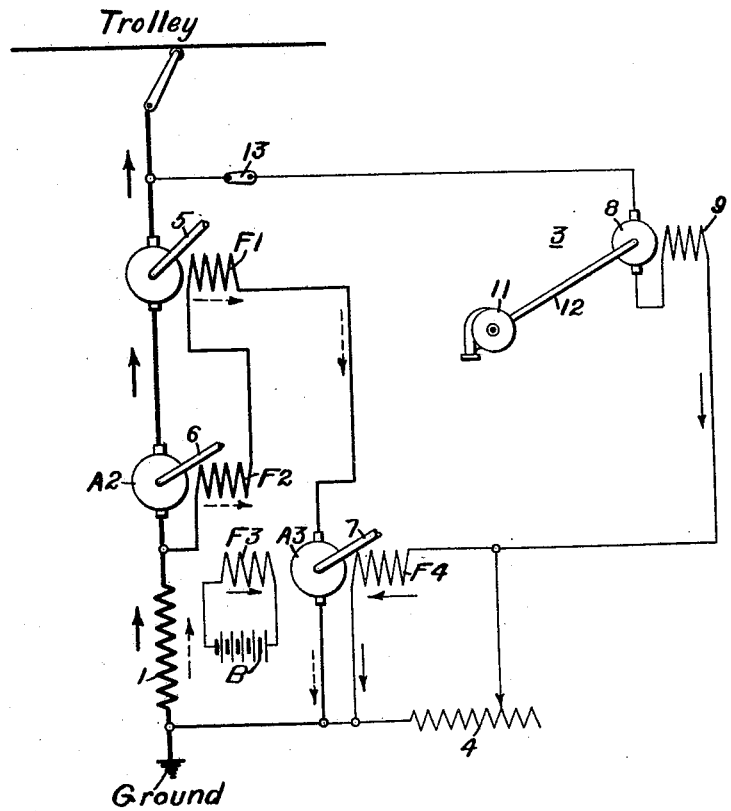
WITNESSES:
J. A. Helsel.
W. P. Coley
INVENTOR
Gerald F. Smith.
BY
Wesley G. Carr
ATTORNEY

UNITED STATES PATENT OFFICE.

GERALD F. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,367,103.   Specification of Letters Patent.   Patented Feb. 1, 1921.

Application filed March 11, 1919. Serial No. 281,922.

*To all whom it may concern:*

Be it known that I, GERALD F. SMITH, a citizen of the United States, and a resident of Wilkinsburg, in the county of Allegheny and State of Pennsylvania, have invented a new and useful Improvement in Systems of Control, of which the following is a specification.

My invention relates to systems of control for dynamo-electric machines and particularly to the regulation of a plurality of momentum-driven railway motors or the like, during the regenerative period.

One object of my invention is to provide a system of the character indicated wherein an exciting machine for the momentum-driven motors has its excitation controlled in accordance with the joint effect of an auxiliary mechanical load and the separate excitation of the exciting machine.

From another aspect, it is the object of my invention to provide an arrangement and energization for the windings of the exciter machine whereby the inherent rise in voltage of the main machines, upon a failure of supply-circuit voltage, such as that caused by the trolley pole momentarily leaving the wire, is inherently maintained within safe limits.

My invention may best be understood by reference to the accompanying drawing, wherein the single figure is a diagrammatic view of a system of control organized in accordance with my present invention.

Referring to the drawing, the system shown comprises suitable supply-circuit conductors respectively marked "Trolley" and "Ground"; a plurality of dynamo-electric machines respectively having commutator-type armatures A1, A2 and A3 and field windings F1, F2 and F3 of the familiar heavy-wire series type; a main-circuit stabilizing resistor or translating device 1, preferably having self-inductive characteristics; an auxiliary mechanical load 3, namely, a blower apparatus; and an auxiliary-circuit-regulating resistor 4. A second field winding F4, which may or may not be employed during accelerating operation of the main machines, is also provided for the armature A3, while the regular series field winding F3 therefor is connected across an auxiliary source of constant voltage, such as a battery B, during the regenerative period.

The armatures A1, A2 and A3 may be all car-propelling motors, suitably connected to the truck axles 5, 6 and 7; or the armature A3 may be driven from an idler axle, or by an auxiliary motor, as desired. In any case, for the purposes of the appended claims, I term the machines having the armatures A1, A2 and A3 as "main machines", while the blower motor is designated as an "auxiliary machine".

The auxiliary mechanical load or blower apparatus 3 comprises a driving armature 8, a series-related field winding 9 therefor and a centrifugal blower 11, which is mounted upon the shaft 12 of the armature 8 for the purpose of supplying ventilation to the main machines. However, any other suitable mechanical load may be substituted for that illustrated although the blower apparatus, because of its rapid increase in power demand upon an increase of speed, is most advantageously employed for the purpose of my present invention. In any case, the characteristic of the mechanical load must be such that the power consumption varies at some rate greater than the first power of the speed. The blower apparatus is especially desirable, since the power demand varies approximately as the cube of the speed.

Assuming that the various circuit connections are made as shown, the operation of the system during the regenerative period may be set forth as follows: The main-armature or load circuit, indicated by the solid arrows, is established from the supply-circuit conductor Ground through the stabilizing resistor 1, main armatures A2 and A1 and thence to the trolley.

The main-field-winding or exciting circuit for the regenerating machines is indicated by the dotted arrows and may be traced from the positive terminal of the exciting armature A3 through the stabilizing resistor 1 in the same direction as that taken by the load current, field windings F2 and F1, and thence to the negative terminal of the exciting armature.

The battery B sends a current through the field winding F3 for the exciting armature in a positive direction, that is, in a direction tending to build up the total flux in the armature, while the circuit of the other field winding F4 for the exciting armature is established from the trolley, or the corresponding terminal of the main armature A1, through hand-switch 13, armature 8 and field winding 9 of the blower motor, whence circuit is completed through the field winding F4 and the regulating resistor 4, in parallel relation, to the supply-circuit conductor Ground. As indicated by the arrows corresponding to field windings F3 and F4, respectively, the flux created by the field winding F4 is differential or negative with respect to that set up by the field winding F3, for a purpose to be described.

Under normal conditions, the resultant flux in the exciting armature A3 is sufficient to energize the main field windings F1 and F2 to effect regenerative operation of the momentum-driven armatures A1 and A2. The voltage of the exciting armature A3 may be increased to compensate for the gradual decrease of the vehicle speed during the retardation period by gradually reducing the active-circuit value of the resistor 4 that shunts the field winding F4, whereby the differential effect of the field winding is gradually reduced to substantially zero, thereby permitting the positively energized field winding F3 to gradually build up the voltage of the exciting armature.

Under emergency conditions, however, namely, the failure of supply-circuit voltage by reason of the trolley pole leaving the wire or passing under a section break, the instantaneous tendency of the momentum-driven machines is to increase somewhat in speed and in voltage to such a degree that an over-voltage relay for opening the machine circuits is necessary to prevent injury to the apparatus unless the arrangement that I illustrate, or its equivalent, is provided. Such increase in voltage is caused by the fact that the voltage drop across the stabilizing resistor 1 disappears when the supply-circuit voltage fails for any reason, whereby a greater potential tends to be impressed upon the exciting field windings F1 and F2 to correspondingly increase the regenerating-armature voltages.

When the main-machine voltage begins to increase in the manner just described, the driving voltage for the blower motor is correspondingly increased by reason of the direct connection of the blower motor across the main-armature circuit. Consequently, the current traversing the blower-motor windings and the field winding F4 for the exciting armature A3 also increases, to exert an augmented differential effect upon the voltage of the exciting armature A3, whereby the potential supplied by the exciting armature to the main field windings F1 and F2 is reduced or maintained at such a value that the generated voltage of the main momentum-driven machines is likewise prevented from attaining a dangerous value.

Normally, that is, during fully operative conditions of the main machines, the above-described regulating effect is negligible, compared with the stabilizing or inherent regulating effect of the main-circuit resistor 1. Since this inherent-stability feature is not of my present invention, but is fully set forth in a patent to Rudolf E. Helmund, No. 1,298,706, granted April 1, 1919, I do not deem it necessary to explain such operation here. Under the above-noted emergency conditions, however, the stabilizing resistor becomes inactive, while the previously-described regulating effect of the blower-motor circuit comes into play.

Although my invention is especially desirable in high-voltage, direct-current systems, it is not thus limited in its application.

Consequently, I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a plurality of dynamo-electric machines severally having armatures and field windings, of a mechanical load, means for connecting one of said machines to excite the other field-windings, means independent of other circuits for separately exciting the field winding of the exciting machine, and means for controlling the excitation of said exciting machine in accordance with the joint effect of said mechanical load and said separate excitation.

2. In a system of control, the combination with a supply circuit and a plurality of dynamo-electric machines severally having armatures and field windings, of a mechanical load, means for connecting one of said machines to excite the other field-windings, means independent of said supply circuit for separately exciting the field winding of the exciting machine, and means for controlling the excitation of said exciting machine in accordance with the joint effect of said mechanical load and said separate excitation.

3. In a system of control, the combination with a plurality of main dynamo-electric machines severally having armatures and field windings, of a mechanical load, an auxiliary machine for driving said load, means for connecting one of said main machines to excite the other main field windings, a constant-voltage source for separately exciting the field winding of the exciting machine, and means for controlling the excitation of said exciting machine in accordance with the joint effect of said auxiliary machine and said separate excitation.

4. In a system of control, the combination with a supply circuit and a plurality of dynamo-electric machines severally having armatures and field windings, of a mechanical load, means for connecting all but one of said machines to regenerate to said supply circuit, means for connecting the remaining machine to excite the field windings of the regenerative machines, means for separately exciting the field winding of the exciting machine, and means for controlling the excitation of said exciting machine in accordance with the joint effect of said mechanical load and said separate excitation.

5. In a system of control, the combination with a supply circuit and a plurality of main dynamo-electric machines severally having armatures and field windings, of a mechanical load, an auxiliary machine for driving said load, means for connecting all but one of said machines to regenerate to said supply circuit, means for connecting the remaining machine to excite the field windings of the regenerative machines, means independent of said supply circuit for separately exciting the field winding of the exciting machine, and means for controlling the excitation of said exciting machine in accordance with the joint effect of said separate excitation and the current traversing said auxiliary machine.

6. In a system of control, the combination with a supply circuit and a plurality of main dynamo-electric machines severally having armatures and field windings, of a mechanical load, an auxiliary machine for driving said load, means for connecting all but one of said machines to regenerate to said supply circuit, means for connecting the remaining machine to excite the field windings of the regenerative machines, an auxiliary source for exciting the field winding of the auxiliary machine, and a second field winding for said exciting machine connected in series relation with said auxiliary machine.

7. In a system of control, the combination with a supply circuit and a plurality of main dynamo-electric machines severally having armatures and field windings, of a mechanical load, an auxiliary machine for driving said load, means for connecting all but one of said machines to regenerate to said supply circuit, means for connecting the remaining machine to excite the field windings of the regenerative machines, an auxiliary source for exciting the field winding of the auxiliary machine, and a second field winding for said exciting machine connected in series relation with said auxiliary machine to act differentially with respect to the auxiliary-source-excited field winding.

8. A system of control comprising a supply circuit, a plurality of main dynamo-electric machines severally having armatures and field windings, a mechanical-load-driving machine, a translating device connected in series relation with all but one of said main machines across the supply circuit, means for connecting the other main machine to excite the field windings of all the main machines but itself, an independent source of energy for the field winding of the exciting machine, and a second field winding for that machine connected in series relation with said load-driving machine.

9. A system of control comprising a supply circuit, a plurality of main dynamo-electric machines severally having armatures and field windings, a mechanical-load-driving machine, a resistor connected in series relation with all but one of said main machines across the supply circuit, means for connecting the other main machine to excite the field windings of all the main machines but itself through said resistor, a battery for exciting the field winding of the exciting machine, and a second field winding for that machine connected in series relation with said load-driving machine to act differentially with respect to said battery-excited field winding.

In testimony whereof, I have hereunto subscribed my name this 27th day of Feb., 1919.

GERALD F. SMITH.